Feb. 27, 1968  E. A. SMITH ETAL  3,370,712
FILTER OF PARTIALLY COMPRESSED STACKED DISCS
Filed March 9, 1965
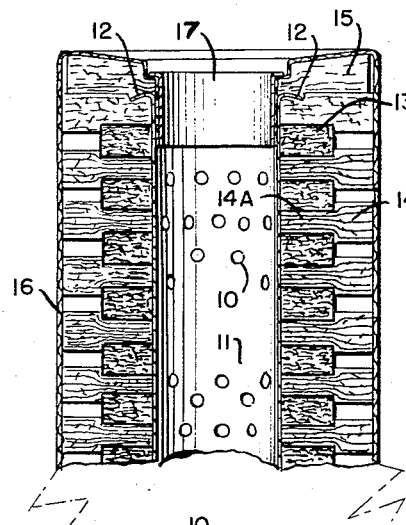
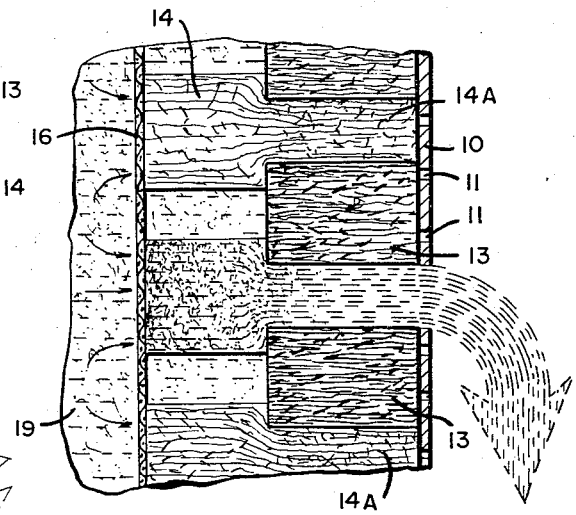
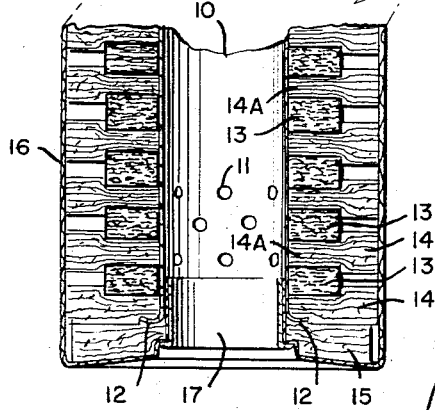
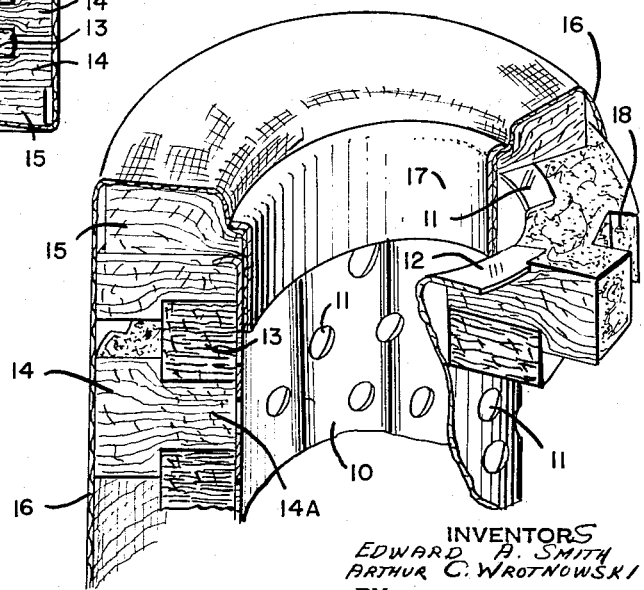
INVENTORS
EDWARD A. SMITH
ARTHUR C. WROTNOWSKI
BY
ATTORNEYS

United States Patent Office 3,370,712
Patented Feb. 27, 1968

3,370,712
FILTER OF PARTIALLY COMPRESSED
STACKED DISCS
Edward A. Smith, Glenville, and Arthur C. Wrotnowski, Greenwich, Conn., assignors to American Felt Company, Glenville, Conn., a corporation of Massachusetts
Filed Mar. 9, 1965, Ser. No. 438,260
4 Claims. (Cl. 210—457)

ABSTRACT OF THE DISCLOSURE

A filter cartridge for a cartridge-type filter in which the end seals are provided without resorting to metal discs attached to the ends of the core for supporting the end seals.

---

This invention relates to cartridges for cartridge-type filters.

Many problems are involved in providing encased filter bodies which are adapted for use in cartridge-type filters. In those cartridges for cartridge-type filters that employ a perforated or foraminous center tube on which discs of filter media are mounted, it is the usual practice to provide a seal at the ends of the cartridge involving some form of hardware attached to the ends of the center core for supporting a gasket material. Thus, the center core and gasket supporting ends may, and usually do, take the form of a spool.

The principal object of this invention is to provide a cartridge for a cartridge-type filter in which end seals are provided without resorting to metal discs attached to the ends of the core for supporting the end seals.

Another object of the invention is to provide such a cartridge in which cap assemblies are not required to effectively seal the ends of the cartridge.

Another object of the invention is to provide such a cartridge in which filtering discs of different diameters are alternately arranged along the foraminous core.

Still another object of the invention is to provide such a cartridge in which the filtering discs are prevented from turning on the core.

A still further object of the invention is to provide such a cartridge in which the larger diameter discs are constructed of soft material, such as felt or yarn, and in a manner to inhibit matting of the fibers of the filter discs during use.

In one aspect of the invention, a core may be made from sheet metal that may be coated with a heat activated adhesive. The sheet metal may be perforated and formed with punched-out notches along two of its opposite edges. The perforated sheet metal may be formed into a hollow cylinder with the notched edges forming the ends of the cylinder.

In another aspect of the invention, discs of filtering media having different diameters may be mounted in alternating relation along the perforated core to points beyond the notched end edges of the core. Accordingly, in order to bend the notched edges radially outwardly, the discs must be compressed about an annulus adjacent their inner peripheries. The degree of such compression is varied by increasing or decreasing the number of discs.

In still another aspect of the invention, a formed, felt end gasket may be applied to each end of the perforated core such that it rests on top of the bent tabs formed by the notched ends of the core, and a flanged tubular element may be forced into each end of the core to secure the gasket as well as the ends of a sock of covering material that surrounds the assembled felt discs.

The above, other objects and novel features of the invention will become apparent from the following specification and accompanying drawing which are merely exemplary.

In the drawing:

FIG. 1 is an elevational view of a cartridge for cartridge-type filter to which the principles of the invention have been applied;

FIG. 2 is an enlarged perspective view of a portion of the cartridge shown in FIG. 1, with parts broken away to show others; and FIG. 3 is an enlarged sectional elevational view of a portion of the cartridge shown in FIGS. 1 and 2.

Referring to the drawing, the principles of the invention are shown as applied to a cartridge for a cartridge-type filter including a core 10 that is made from sheet metal that may be coated with a heat activated adhesive for a purpose to be described later. The sheet of sheet metal may be provided with perforations 11 and may be notched along two opposed ends, forming tabs 12. The perforated and notched sheet of sheet metal may then be rolled into a cylindrical form, and its abutting edges may be securely fastened together by any suitable means.

Alternating discs of filtering media 13 and 14 may be arranged along the cylindrical core 10 and they may be made of a soft, felted, fibrous material. The discs 14 are of a substantially larger diameter than the discs 13, the latter serving to space apart the discs 14.

The felted, fibrous material may be made from natural or synthetic fibers, and preferably synthetic fibers such as viscose, triacetate, acrylic, tetrafluoroethylene fibers and the like, which fibers have been made into batts that are needled, i.e., formed by passing needles transversely through the batts to cause many of the fibers to extend transversely through the batts to maintain them of uniform construction. It has been found that, as an example, the material from which the discs 14 are made could have a weight of about 38 ounces per square yard and possess a specific gravity of about 0.163; and the material for the discs 13 could be made from a material having a weight of about 46 ounces per square yard with a specific gravity of about 0.246. Preferably, the fibers are of a predetermined fiber denier so that there is a uniformity of pore size for a given denier.

It has further been found that superior filtration results can be achieved by increasing the specific gravity of an anular portion of the large diameter discs 14 as well as substantially all of the spacer discs 13. This has been accomplished in the present invention by using the tabs 12 to compress an annular portion 14A of the larger discs 14 adjacent the core 10 to a specific gravity, for example, within the range of about 0.180 to 0.420, while retaining the specific gravity of the uncompressed portion of the larger discs 14 in the neighborhood of 0.163. Other types of holding means could be used, and the term "tab" is not to be limited to the exact form illustrated. As an example, prior to assembly, in their uncompressed state, the discs 14 may be 0.312 inch thick, while discs 13 may be 0.250 inch thick.

When assembled and in their compressed state, the portions 14A of disc 14 and substantially the entire portion of discs 13 may be compressed to an extent that their specific gravity is about 0.258, while the uncompressed portion of discs 14 remain at a specific gravity of about 0.163.

Of course, other specific gravities or densities can be used, but generally the above recited relationships being present, a superior filter cartridge will be produced.

A gasket 15, generally made of the same fibrous material as discs 13 and 14, is located at each end of the cartridge. A sock 16 of woven fabric may encase the assembly with its ends folded over the outer extremity of the gaskets 15 and both the fabric ends and the gaskets 15 are held firmly to the assembled cartridge by flanged, tubular element 17 that frictionally fit the I.D. of the core 10. The discs 14 may be provided with peripheral slots 18 to increase their effective filtering area.

In operation, the device is usually employed as an "outside-in" filter, although it may be used as an "inside-out" filter. In the former case, the sock 16 collects large particles from the liquid 19, preventing the clogging of the pores of the discs 14 and 13. The uncompressed portions 14 collect larger particles, but ones which are larger than those desired to be removed, and finally, the compressed portion 14A and spacers 13 collect the very finest particles within the capability of the filter.

From the foregoing, it is evident that the filter has been constructed so that it possesses a progressively diminishing porosity measured from the exterior to the interior of the filter cartridge. The cartridge has consistent density that progressively increases from outside to inside and ensures uniform filtering rate.

Advantages of the newly constructed cartridge include edge flow design, providing maximum filter performance, and increased solids capacity at lower pressure drop.

Turning of discs 13 and 14 relative to core 10 will cause fibers on the inner peripheral surface of the discs that contact the core to become dislodged, tending to contaminate the filtrate. In order to inhibit this action, the adhesive on the outer surface of core 10 can be activated by heating the assembly if it is a heat activating adhesive; or liquid adhesive may be applied to the outer surface of core 10, in which case it becomes effective during assembly of the discs 13 and 14 on core 10. The adhesive when set effectively inhibits the dislodging of loose fibers on discs 13, 14 by preventing their turning relative to core 10.

Although the various features of the improved filter have been shown and described in detail to fully disclose one embodiment of the invention, it will be evident that changes may be made in such details and certain features may be used without others without departing from the principles of the invention.

What is claimed is:

1. A cartridge for a cartridge-type filter comprising a foraminous center core having tab means at each end thereof; fibrous filtering discs of different diameters arranged in alternating relation along said center core, the larger of said discs being of a porosity less than that of said smaller discs; tab means forming part of said core adapted when bent radially outwardly to compress said smaller discs and an annular portion of said larger discs to a porosity less than that of the uncompressed portions of said larger discs; gasket means held in abutting relation with each of said cartridge and said tab means; and flanged tubular means cooperating with said core to hold said gasket means in assembled relation with said core and discs.

2. A cartridge for a cartridge-type filter comprising a foraminous center core having tab means at each end thereof; fibrous filtering discs of different diameters arranged in alternating relation along said center core, the larger of said discs being of a porosity less than that of said smaller discs; tab means forming part of said core adapted when bent radially outwardly to compress said smaller discs and an annular portion of said larger discs to a porosity less than that of the uncompressed portions of said larger discs; gasket means held in abutting relation with each end of said cartridge and said tab means; a woven fabric covering for said cartridge and gasket means; and flanged tubular means cooperating with said core to hold said covering and gasket means in assembled relation with said core and discs.

3. A cartridge for a cartridge-type filter comprising a foraminous center core having tab means at each end thereof; fibrous filtering discs of different diameters arranged in alternating relation between said center core, the larger of said discs being of a porosity based on a specific gravity of 0.163 and when compressed said porosity is less than that of said smaller discs; tab means forming part of said core adapted when bent radially outwardly to compress said smaller discs and an annular portion of said larger discs to a porosity such that the specific gravity of said compressed portion of said larger discs is within the range of 0.18 to 0.42; gasket means held in abutting relation with each end of said cartridge; a woven fabric covering for said cartridge and gasket means; and flanged tubular means cooperating with said core to hold said covering and gasket means in assembled relation with said core and discs.

4. A cartridge for a cartridge-type filter comprising a foraminous center core having tab means at each end thereof; fibrous filtering discs of different diameters arranged in alternating relation between said center core, the larger of said discs being of a porosity based on a specific gravity of 0.163 and when compressed said porosity is less than that of said smaller discs; tab means forming part of said core adapted when bent radially outwardly to compress said smaller discs and an annular portion of said larger discs to a porosity such that the specific gravity of said compressed portion of said larger discs is about 0.258; gasket means held in abutting relation with each end of said cartridge and said tab means; a woven fabric covering for said cartridge and gasket means; and flanged tubular means cooperating with said core to hold said covering and said gasket means in assembled relation with said core and discs.

References Cited

UNITED STATES PATENTS

| 2,345,849 | 4/1944 | Winslow et al. | 210—458 |
| 2,455,486 | 12/1948 | Hicks | 210—492 |
| 2,675,919 | 4/1954 | White | 210—475 X |
| 2,692,686 | 10/1954 | Fleck et al. | |
| 2,770,426 | 11/1956 | Sievers | 210—437 X |

FOREIGN PATENTS

| 922,579 | 2/1947 | France. |
| 583,231 | 10/1958 | Italy. |

SAMIH N. ZAHARNA, *Primary Examiner.*

REUBEN FRIEDMAN, *Examiner.*

F. MEDLEY, *Assistant Examiner.*